United States Patent Office 3,320,092
Patented May 16, 1967

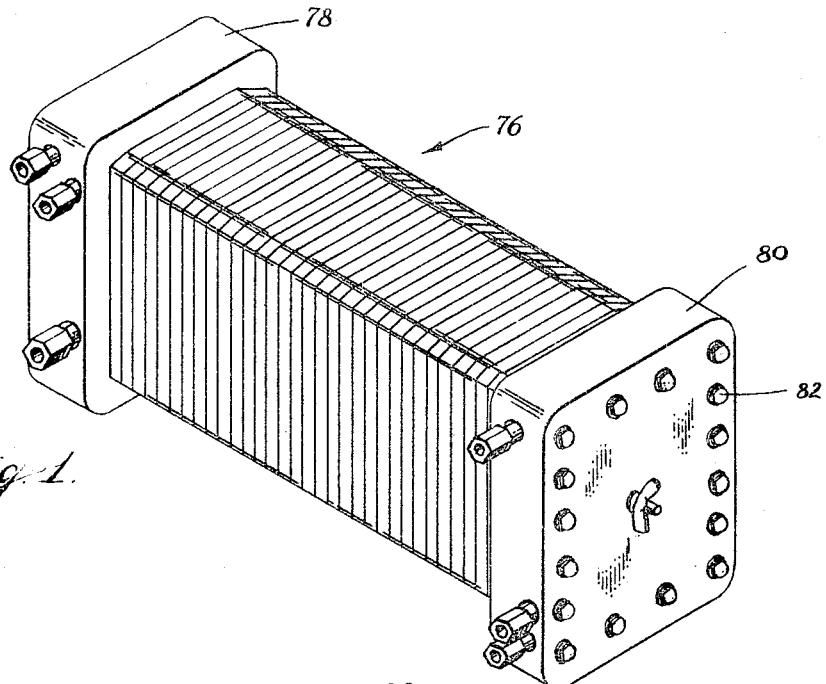
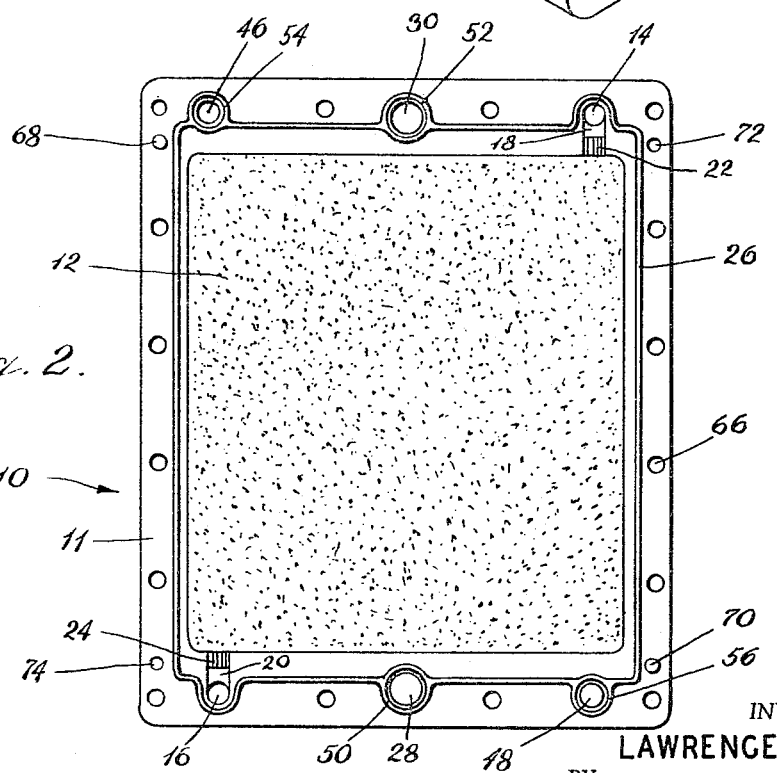

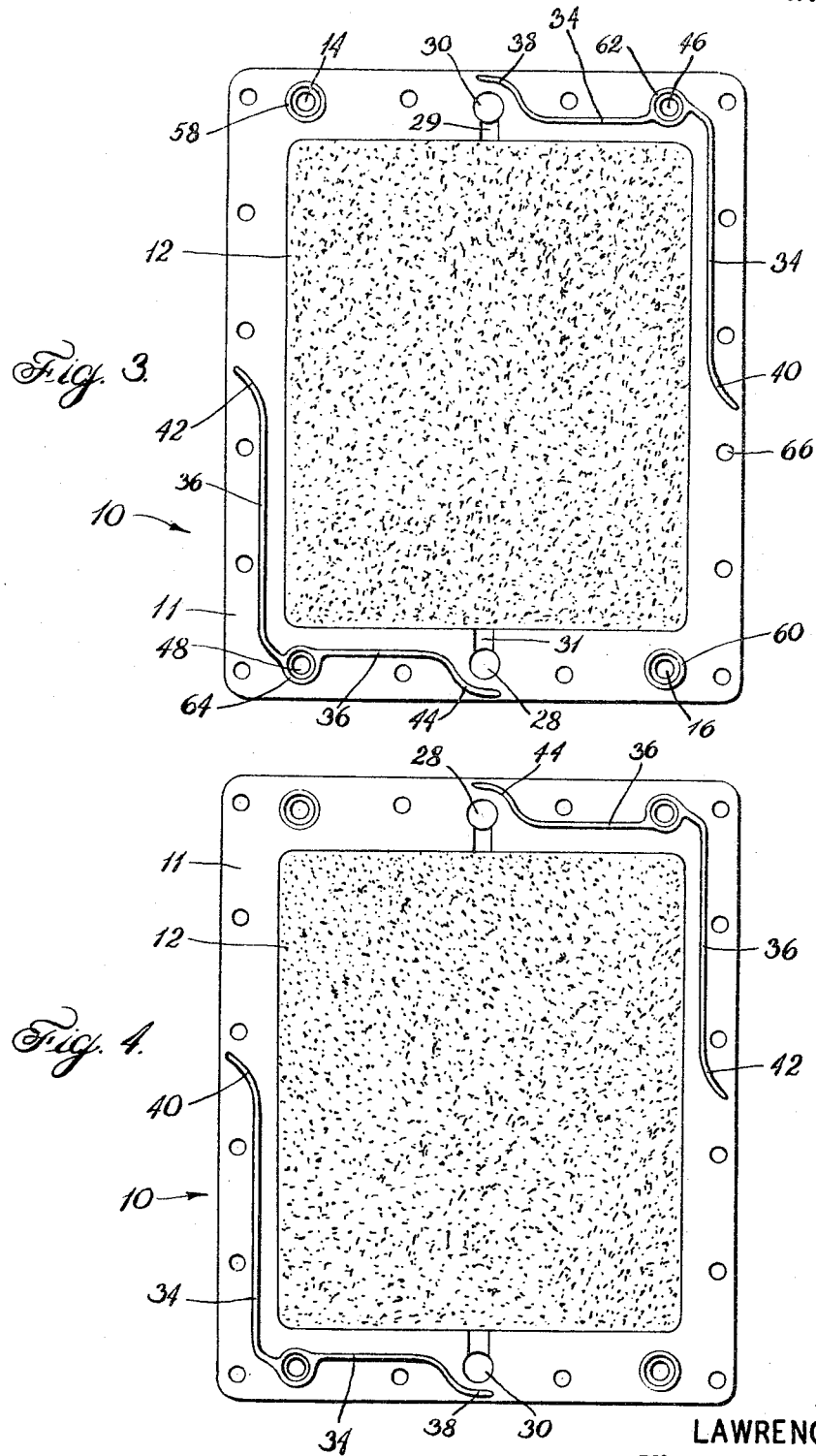

3,320,092
FRAME FOR FLAT PLATE FUEL CELL
ELECTRODES
Lawrence J. Uline, Lakewood, Ohio, assignor to Union Carbide Corporation, a corporation of New York
Filed Dec. 28, 1962, Ser. No. 248,083
10 Claims. (Cl. 136—86)

This invention relates to a flat plate fuel cell electrode and refers more particularly to an improved frame for a flat plate fuel cell electrode assembly.

An excellent flat plate fuel cell battery construction is disclosed in copending United States application Ser. No. 108,400 filed May 8, 1961, now U.S. Patent 3,278,336. The flat plate fuel cell electrode assembly disclosed in the copending application comprises a flat plate carbon electrode about which is a peripheral frame of insulating material which may be molded therearound or marginally secured thereto by a cementing or potting agent in a leak-proof manner. The frame is composed of an insulating material which exhibits excellent resistance to attack by the caustic electrolyte utilized in the battery. About the periphery of the frame is provided a plurality of apertures. Some of the apertures are for the passage of gases, either fuel gas, i.e. hydrogen, or oxidant gas, i.e. oxygen, to and away from one face of the electrode and others of which are for passage of electrolyte to and away from the opposite face of the electrode.

On each side of the frame communicating with the appropriate apertures are grooves which insure delivery of gas or electrolyte, as the case may be, to the desired face of the electrodes. The frame is also provided on each side thereof with a generally peripheral groove for the reception of a sealing O-ring, these grooves extending partially about the apertures so that such apertures lie within the area encompassed by the O-rings. Grooves are also provided on both sides of the frame which completely surround the gas and electrolyte apertures, these grooves being adapted to receive individual O-rings. These O-rings around the periphery and around the gas and electrolyte apertures makes possible a good individual seal of the gas and electrolyte apertures and the gas electrolyte faces of each electrode unit of the battery.

A disadvantage of this type construction is that periodically, breakage of the carbon electrodes in the casting or molding operation occurs. Compounding this is the fact that the electrodes have already been through numerous operations prior to their being finished by having frames molded thereupon. Furthermore, the construction of such a battery requires considerable time and skill in placing and maintaining the plurality of O-rings in position during assembly.

It is, therefore, the principal object of the invention to provide a flat plate electrode, having an improved frame assembly for use in a fuel cell.

Another object is to prevent electrode breakage during fabrication and to impart improved shock resistance to the electrode frames and to the battery assembly.

Still another object is to provide an improved battery assembly having a minimum number of components and one which can be easily assembled.

These and other objects of the invention are achieved by a flat plate fuel cell electrode unit comprising a resilient frame marginally secured about an electrode, the frame being provided with a plurality of sealing beads for sealing the apertures in the frames and the chambers formed by the space between adjacently stacked electrode units.

For a better understanding of the instant invention, reference may be had to the accompanying drawing in which:

FIGURE 1 is a perspective view of a battery of fuel cells comprising a plurality of electrodes having frames of the invention embodied therein;

FIGURE 2 is a vertical elevation of an electrode and frame unit utilized in the battery of FIGURE 1 and illustrating the gas face of the electrode;

FIGURE 3 is a view similar to FIGURE 2 but showing the reverse side of the electrode and frame unit, that is, the electrolyte face of the electrode; and FIGURE 4 is identical to FIGURE 3 but showing the electrolyte face of an adjacent electrode and frame unit of the battery and which when placed face to face with the electrode and frame unit of FIGURE 3 would form a cell of the battery.

Referring now to the drawing, and particularly to FIGURES 2 and 3, there is shown an electrode unit 10 embodying the invention comprising a resilient frame 11 and a carbon plate electrode 12, the gas face of which is shown in FIGURE 2 and the electrolyte face of which is shown in FIGURE 3. The electrode unit 10 as shown here represents the hydrogen electrode or the anode of a fuel cell. The electrode units of the present invention are secured together in a similar manner as shown and described in the above referred to U.S. Patent No. 3,278,336, i.e. anodes and cathodes are alternately stacked in the formation of a battery. The electrolyte faces of the electrodes 12 for each unit are positioned adjacent to each other to form individual cells of the battery.

In the upper marginal portion of the frame 11, as shown in FIGURE 2, is an aperture 14, which is used for introducing a fuel gas, for example hydrogen, to the gas face of the electrode 12 when a plurality of units are alternately assembled with a plurality of cathodes to form a battery. In the lower marginal portion of the frame 11 is an aperture 16 for passage of the gas away from the gas face of the electrode 12. The apertures 14 and 16 communicate through short and relatively broad channels 18 and 20 which in turn are connected to a plurality of narrower channels 22 and 24, the narrower channels 22 and 24 being defined by ribs in the frame 11. The electrode is slightly recessed or disposed somewhat below the bottom of the channels 22 and 24, thereby allowing a gap or space sufficient for substantially uniformly distributing the gas over the entire gas face of the electrode 12 from the aperture 14, and for substantially uniformly passing of the gas out through the aperture 16.

A generally peripheral sealing bead 26 is integrally provided in the marginal portions of the frame 11 and partially surrounds the apertures 14 and 16. The sealing bead 26 is designed to seal against an adjacent flat metal barrier-conductor plate, which plate is clearly shown and described in above-identifed copending application.

The opposite side of the electrode unit incorporating the electrolyte face of the electrode 12 is somewhat similarly constructed as shown in FIGURE 3. An aperture 28 is provided in the lower marginal portion of the frame 11 for the introduction of electrolyte, for example potassium hydroxide solution, to the electrolyte face of the electrode 12, the flow of electrolyte over the electrolyte face of the electrode 12 being counter-current to the flow of gas over the gas face of the electrode 12. The upper marginal portion of the frame 11 is provided with an aperture 30 for passage of the electrolyte out of the battery. The apertures 28 and 30 communicate to the surface of electrode 12, which is slightly recessed, via slots or channels 29 and 31. If desired, the electrolyte may be uniformly dispersed laterally from the aperture 28 to the surface of the electrode 12 by an inlet manifold or a lateral groove (not shown) in the lower marginal portion of the frame 11. For collecting and passing the electrolyte out through the aperture 30, an exhaust manifold or another lateral groove (not shown) may likewise be provided in the upper marginal portion of the frame 11. For the purpose of sealing the electrolyte face of the electrode 12 when a battery is assembled, two raised sealing beads 34 and 36, similar to the sealing bead 26, are provided suitably in opposite corners. Each bead 34 and 36 extends from a corner in two directions and forms an L shaped bead which encircles slightly more than one quarter of the perimeter of the electrode and frame. Together the sealing beads 34 and 36 encircle slightly more than half of the electrode perimeter. The terminal ends 38, 40, 42 and 44 of the beads 34 and 36 angle away from the electrode edges such that they overlap in a criss-cross like manner the terminal ends of the quarter beads 34 and 36 of the next adjacent electrode unit 10 (FIGURE 4). When a battery is assembled, the quarter beads 34 and 36 of the electrode units 10 seal against the flat portions of the face of the frames 11 and at the cross intersection points of the beads of both frames near their terminal ends 38, 40, 42 and 44 which overlap to complete the seal.

The frame 11 is also provided with an aperture 46 in its upper marginal portion for by-passing the oxidant gas, for example oxygen, around the hydrogen electrode and frame, to the gas face of the adjacent electrode units which are oxygen electrodes or the cathodes of the battery assembly. An aperture 48 is provided in the lower marginal portion of the frame 11 for by-passing the oxidant gas away from the gas face of the next adjacent electrode unit.

On the side of the electrode unit 10 incorporating the gas face of the electrode 12 illustrated in FIGURE 2, the apertures 28 and 30 for the electrolyte are provided with peripheral beads 50 and 52 serving to seal the apertures 28 and 30 when the electrode unit is assembled into a battery. The apertures 46 and 48 for the oxidant gas are similarly provided with peripheral beads 54 and 56.

Referring again to FIGURE 3, on the side of the electrode unit incorporating the electrolyte face of the electrode 12, the apertures 14, 16, 46 and 48 for the fuel gas are similarly provided with sealing peripheral beads 58, 60, 62 and 64. As shown in FIGURE 2, the sealing beads 50 and 52 encompassing the apertures 28 and 30 are actually part of the peripheral sealing bead 26. Likewise, as best shown in FIGURE 3, the sealing beads 62 and 64 encompassing the apertures 46 and 48 are actually part of the sealing beads 34 and 36.

The size of the various beads is a matter of design and is not necessarily dependent upon the electrode and frame size, notwithstanding the fact that smaller beads have been used on smaller electrode units. The frame and beads are integrally formed together in a mold and thereafter the frame is assembled onto an electrode by snapping the frame over the marginal edges of the electrode. The frame may suitably be adhered to the marginal edges of the electrode with a sealing resin, although the resiliency of the frame under assembly pressure effects a good seal. The frame material is an elastomer which is flexible and resilient. Neoprene, or buna N having a hardness or durometer reading of about 80 are suitable because of their chemical resistance to alkaline electrolytes used in one type of battery and resistance to attack by moist oxygen. Other natural and synthetic materials which are elastic or resilient and which have characteristics of natural and synthetic rubber may be used. Of course, the particular material used must possess properties which resist oxidation and various corrosive chemicals, etc.

The frame 11 in its marginal portions is also provided with a plurality of substantially equally spaced apertures generally indicated at 66 in FIGURES 2 and 3, these apertures being provided for tie rods or assembly bolts for securing a number of pairs of electrode units into a battery. In the opposite corners of the frame 11 and on the side of the electrode unit incorporating the gas face of the electrode 12 are dowel or alignment pins 68 and 70, and are best shown in FIGURE 2. Registered apertures 72 and 74 for receiving similar alignment pins on the frame of the next adjacent electrode unit of a battery are also shown. The pins 68 and 70 align the frames and electrodes of each unit when the battery is assembled.

While an electrode unit embodying the invention has been described with particular reference to the hydrogen electrode or anode for a fuel cell, it is to be understood that the electrode unit incorporating the oxygen electrode or cathode for the cell is structurally identical.

A battery 76 of fuel cells made up of electrode units of the invention is illustrated in FIGURE 1. The battery as shown comprises a number of electrode units of the type described properly arranged and stacked together to form a plurality of fuel cells, the electrode units being bolted between a pair of end plates 78 and 80 by a plurality of tierods or assembly bolts generally indicated at 82.

It should be noted that the improved frame eliminates the use of O-rings or other sealing gaskets or mechanisms. Another advantage of the improved frame is that it reduces assembly time and minimizes breakage of the electrodes since the frames need not be molded around the electrodes but rather just snapped over them and suitably sealed to the marginal edges of the electrodes. The invention also precludes the possibility of assembling a fuel cell with one or more defective or missing O-rings, gaskets, or gasket-like devices.

It should also be noted that the frame can be provided with two complete peripheral sealing beads, one on either side of the frame. However, such a construction entails greater expense because of the need for two molds; the main disadvantage being that the frames for the hydrogen and oxygen electrodes would not be interchangeable with each other.

What is claimed is:

1. A flat electrode unit for a fuel cell which comprises: (1) a frame of an elastomer material and a carbon plate electrode having a gas face and an electrolyte face marginally secured therein, said frame having a plurality of apertures spaced about its peripheral margin, at least one of said apertures communicating with a channel so constructed and arranged in one side of said frame as to provide access of gas to the gas face of said electrode, and at least another of said apertures communicating with a channel so constructed and arranged in the opposite side of said frame as to provide access of electrolyte to the electrolyte face of said electrode; and (2) sealing beads integrally molded with said frame and completely circumscribing the peripheral margin of at least one side of said frame, said circumscribing sealing bead partially surrounding certain of said apertures and completely surrounding others of said apertures.

2. The electrode unit of claim 1 wherein the remaining apertures, excluding apertures for aligning and securing a plurality of said electrode units together, are sealed by annular shaped beads integrally formed with said frame.

3. A fuel cell battery comprising a plurality of electrode units as defined in claim 1 arranged with the gas faces of pairs of units of opposite polarity adjacent to each other but physically separated by a metal member, a portion of said member making physical and electrical contact with one of said pairs of electrode units and other portions of said member making physical and electrical contact with the other of said pairs of electrode units.

4. A fuel cell battery as defined in claim 3 in which each of said pairs of units is sealed by a bead integrally formed with the frames of adjacent units.

5. A fuel cell battery as defined in claim 3 in which said pairs of units are sealed by beads integrally formed with the frames of adjacent units.

6. A fuel cell battery as defined in claim 3 in which said gas faces of said pairs of units and at least said apertures communicating with said gas faces in said frames of said pairs of units are sealed by annular beads integrally formed with said frames, and in which other apertures in said frames are sealed by annular beads integrally formed with said frames.

7. A flat electrode unit for a fuel cell, which comprises: (1) a frame of an elastomer material and a carbon plate electrode having a gas face and an electrolyte face marginally secured therein, said frame having a plurality of apertures spaced about its peripheral margin, at least one of said apertures communicating with a channel so constructed and arranged in one (gas) side of said frame as to provide access of gas to the gas face of said electrode, and at least another of said apertures communicating with a channel so constructed and arranged in the opposite (electrolyte) side of said frame as to provide access of electrolyte to the electrolyte face of said electrode; (2) said frame having on the gas side thereof and integrally formed therewith a sealing bead which completely circumscribes the peripheral margin of said frame, partially surrounds certain of said apertuers constructed to provide access of gas to and from said electrode gas face; and completely surrounds others of said apertures, and (3) said frame having on the electrolyte side thereof a pair of integrally formed quarter sealing beads disposed in opposite corners of said frame which together enclose slightly more than half of said electrode frame periphery and which angle away from the electrode frame edge at the terminal points of each quarter bead, said quarter sealing beads together with quarter sealing beads of another electrode unit of its kind when assembled into a battery forming a sealed chamber for providing access of electrolyte to and from said electrolyte face.

8. The electrode unit of claim 7 wherein the remaining apertures, excluding apertures for aligning and securing a plurality of said electrode units together, are sealed by annular shaped beads integrally formed with said frame.

9. The electrode unit of claim 8 wherein locating pins are provided on said frame for registering the same with another of its kind when assembling a battery.

10. The electrode unit of claim 9 wherein said channel for gas is defined by ribs formed in said frame.

No references cited.

WINSTON A. DOUGLAS, *Primary Examiner.*

H. FEELEY, *Assistant Examiner.*